United States Patent [19]

Arroyo

[11] Patent Number: 4,474,246
[45] Date of Patent: Oct. 2, 1984

[54] HAND-ATTACHED GROUND SCRAPER

[76] Inventor: Reinaldo P. Arroyo, Box 1513, Mayaguez, P.R. 00709

[21] Appl. No.: 513,689

[22] Filed: Jul. 14, 1983

[51] Int. Cl.³ .............................................. A01B 1/10
[52] U.S. Cl. ....................................... 172/370; 294/25
[58] Field of Search ......................... 172/370; 30/298; 294/25, 26; 2/21

[56] References Cited

U.S. PATENT DOCUMENTS

| | | | |
|---|---|---|---|
| 467,364 | 1/1892 | Breen | 294/25 |
| 1,128,556 | 2/1915 | Vincent | 294/25 X |
| 1,985,674 | 12/1934 | Baver | 172/370 |
| 2,975,843 | 3/1961 | Lattin | 172/370 |

FOREIGN PATENT DOCUMENTS

| | | | |
|---|---|---|---|
| 32978 | 12/1962 | Finland | 172/370 |
| 323863 | 1/1930 | United Kingdom | 172/370 |

*Primary Examiner*—Richard T. Stouffer
*Attorney, Agent, or Firm*—Scrivener Clarke Scrivener and Johnson

[57] ABSTRACT

A device is attached to the human hand and has parts extending along and attached to each finger and extending beyond the outer end of each finger to provide a tool for digging in the ground. The device is formed of a flat sheet material having a central part which covers the outer part of the palm of the hand and from which the parts attached to each finger extend radially outwardly. Bendable tabs extend outwardly from each side of each finger part to be bent behind the finger of the hand to attach the tool to the hand.

1 Claim, 2 Drawing Figures

HAND-ATTACHED GROUND SCRAPER

SUMMARY OF THE INVENTION

A ground scraping or cultivating tool is formed of a flat sheet material having a central part which covers the outer part of the palm of the hand and from which radial parts extend outwardly corresponding to the fingers of the hand. Bendable tabs extend outwardly from each side of each finger part to be bent behind the finger of the hand to attach the tool to the hand. Each finger part extends beyond the tip of the finger to which it is attached to provide a ground engaging and digging tool.

DESCRIPTION OF THE PREFERRED EMBODIMENT OF THE INVENTION

Figure 1:
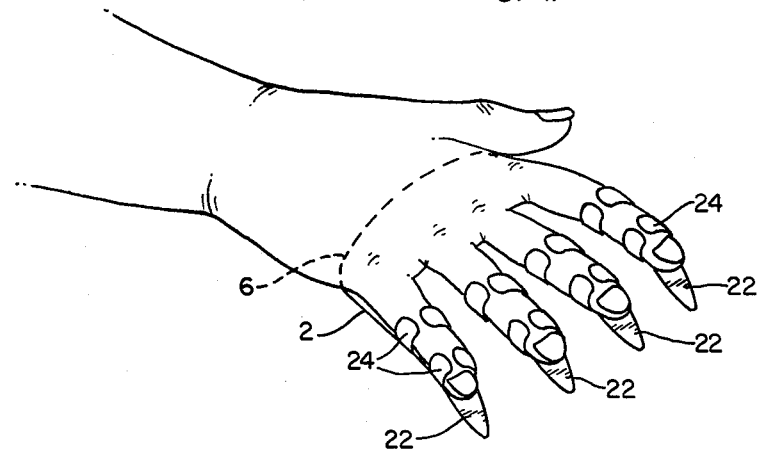
FIG. 1 is a perspective view of the invention showing the manner in which it is attached to the human hand.
Figure 2:
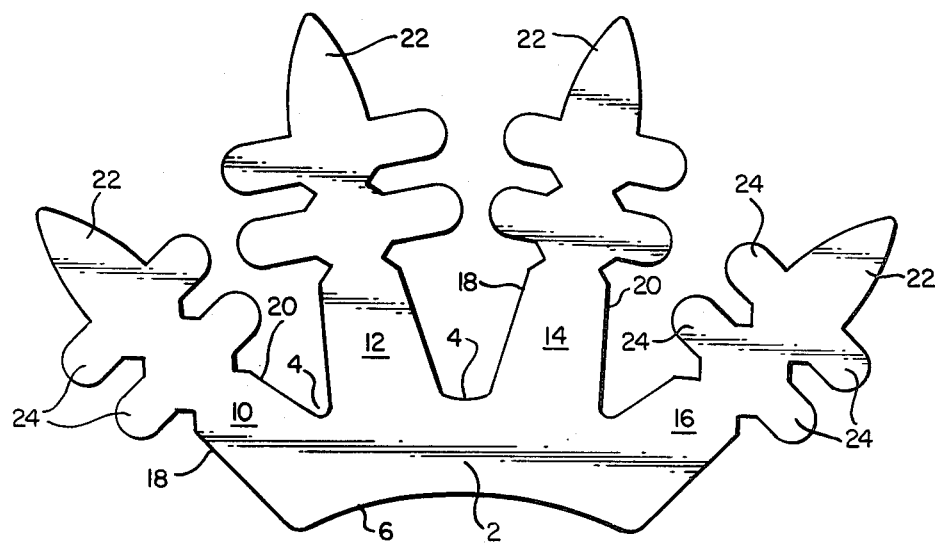
FIG. 2 is a view of the invention prior to bending portions of the device to position it on the human hand.

By this invention I have provided an agricultural tool which in its normal condition is a flat thin sheet of material, preferably metal, the shape of which is generally similar to that of the human hand and which is adapted to be attached temporarily to the hand to be used in scraping or digging in the ground.

The preferred embodiment of the invention is disclosed in the drawings and comprises a flat sheet of metal having a central part 2 which is shaped to generally conform to the shape of that part of the palm of the hand of a human being which is adjacent the fingers, and which is of such a size that it will cover approximately the outer half the palm. This palm-engaging part 2 has an outer transverse edge 4, which lies adjacent the root ends of the fingers when the tool is used, and an inner edge 6 which approximately transversely bisects the palm when the tool is in use.

Four elongated finger-like members 10, 12, 14, 16 are formed integrally with the central, palm engaging part 2 and radiate outwardly from the outer edge 4 of that part in general conformity with the positions of the four fingers of the human hand. Each of these finger parts has side edges 18, 20, and an outer end 22. Integrally formed with each of the finger parts and extending outwardly from each of its side edges are a plurality of elongated, narrow tabs 24 each of which is of such length and is so connected by a line of bendable material to its finger part that when the tool is in place on the palm and fingers each tab may be bent to a position behind the finger with which it is associated, thus attaching each finger part to its associated finger and thus attaching the tool to the hand as shown in FIG. 1.

The tool provided by the invention may be made in various sizes to fit various sizes of the human hand, and in each size the finger parts 10, 12, 14, 16 are made longer than the normal fingers of that size of hand so that when the tool is in place on the hand the outer end part 22 of each finger part will extend beyond the human finger to which it is attached thus providing at and beyond the end of each finger a digging and cultivating tool which may be manipulated by the hand to which it is connected.

The entire device is preferably formed of a material such as galvanized sheet metal, hard plastic glass or aluminium and the bendable connection of each tab 24 to the finger part may be formed by a line of reduced thickness of the metal from which the tool is made.

I claim:

1. A unitary ground cultivating tool formed of flat bendable sheet material for attachment to the human hand, comprising:
    (a) a first flat part having elongated substantially parallel edges which are of greater length than the distance between them, which part is adapted to engage the part of the palm adjacent the fingers,
    (b) four elongated members formed integrally with the first part and extending outwardly in generally parallel relation to each other from one of the edges of the first part, said members being positioned in spaced relation to each other along said one edge and each havig a pointed outer end, each of these members being adapted to extend along a finger when the first part engages the palm, and
    (c) tabs extending from the opposite sides of each of the four elongated members, at least one pair of said tabs on each of said members being positioned generally midway between where said each of said members joins said one of the edges of the first part and said outer end of said each of said members for facilitating engaging the first part with the palm of a human hand while bending the tabs about a finger to attach the tool to the hand.

* * * * *